United States Patent [19]

Beyer et al.

[11] Patent Number: 5,373,135
[45] Date of Patent: Dec. 13, 1994

[54] PROCESS AND AN ARRANGEMENT FOR TREATING WORKPIECE BY MEANS OF LASER RADIATION

[75] Inventors: Eckhard Beyer, Rott/Roetegen, Germany; Dirk Petring, Kerhrade, Netherlands; Peter Abels, Alsdorf; Gerd Harzinger, Roetgen-Rott. both of Germany

[73] Assignee: Fraunhofer-Gesellschaft zur Foerderung der angewandten Forschung e.V., Germany

[21] Appl. No.: 679,090

[22] PCT Filed: Dec. 21, 1989

[86] PCT No.: PCT/DE89/00781

§ 371 Date: Apr. 20, 1992

§ 102(e) Date: Apr. 20, 1992

[87] PCT Pub. No.: WO90/07398

PCT Pub. Date: Jul. 12, 1990

[30] Foreign Application Priority Data

Dec. 30, 1988 [DE] Germany .............................. 3844296
Dec. 30, 1988 [DE] Germany .............................. 3926859

[51] Int. Cl.$^5$ ............................................. B23K 26/14
[52] U.S. Cl. ........................... 219/121.67; 219/121.62; 219/121.72; 219/121.83
[58] Field of Search ....................... 219/121.61, 121.62, 219/121.83, 121.72, 121.66, 121.67, 121.63, 121.68, 121.85, 121.83, 121.74

[56] References Cited

U.S. PATENT DOCUMENTS

| 4,825,035 | 4/1989 | Moriyasu et al. | 219/121.61 |
| 5,041,714 | 8/1991 | Funk | 219/121.62 |
| 5,196,672 | 3/1993 | Matsuyama et al. | 219/121.83 |

*Primary Examiner*—C. L. Albritton
*Attorney, Agent, or Firm*—Evenson, McKeown, Edwards & Lenahan

[57] ABSTRACT

A process for treating workpieces by means of laser radiation, particularly for the cutting, hole burning and material removal with respect to metallic workpieces, in which the treated site of the workpiece is monitored by a radiation detector which contributes to reducing the intensity of the laser radiation when an upper limit value is reached and to increasing it when a lower limit value is reached. In order to achieve a controlled process without exceeding a critical temperature, such as the evaporation temperature, in a simple manner, the process is carried out such that, by the radiation detector, the heat radiation is measured which emanates from its treatment site, by which an upper temperature is monitored as the upper limit value of a predetermined temperature range and a lower temperature is monitored as the lower limit value of this temperature range, and in that the laser radiation, when the upper limit value is reached, is switched off and is switched on again when the lower limit value is reached.

18 Claims, 7 Drawing Sheets

PROCESS AND AN ARRANGEMENT FOR TREATING WORKPIECE BY MEANS OF LASER RADIATION

TECHNICAL FIELD

The invention relates to a process for treating workpieces by means of laser radiation, particularly for the cutting, hole burning and removal of material with respect to metallic workpieces, in which the treated site of the workpiece is monitored by means of a radiation detector which contributes to reducing the intensity of the laser radiation when an upper limit value is reached and to increasing it when a lower limit value is reached.

STATE OF THE ART

A process of the initially mentioned type is known in the case of a treatment method in which laser-induced plasma is used. The respective upper limit value is that laser intensity at which a laser-induced detonation wave is generated. The lower limit value is that laser intensity which is at least required for the production of a surface plasma. The known radiation detector monitors the plasma radiation or other physical quantities originating from the plasma so that, by using the measuring results, the laser intensity can be controlled by a suitable modulation in the sense of maintaining the plasma formation while avoiding an undesirable detonation wave.

REPRESENTATION OF THE INVENTION

In contrast, the invention is based on the object of improving a process of the initially mentioned type in such a manner that it may also be used when the work takes place without plasma, particularly during hole burning, cutting and removing of material.

This object is achieved in that, by means of the radiation detector, the heat radiation emanating from its treatment site is measured, by which a higher temperature is monitored as the upper limit value of a predetermined temperature range and a lower temperature is monitored as the lower limit value of this temperature range, and that the laser radiation is switched off when an upper limit value is reached, and is switched on again when a lower limit value is reached.

First, it is important for the invention that heat radiation emanating from the treatment site is used as the measurable variable for a controlled process. The heat radiation is a function of the temperature, that is, at specific temperatures, heat or light is generated of a very specific wave length. When heat radiation of this wave length occurs with a specific intensity, it may be assumed that the treatment site has a very specific temperature characterized by the wave length and its intensity. At this temperature, a specific treatment result exists for a specific workpiece geometry, for example, a specific still acceptable cut quality. This higher temperature determining the upper limit value is in each case determined empirically, according to supplied information, such as the discussed workpiece geometry, the cut quality, the cutting speed, the material, or the like. Also the lower limit value of a predetermined temperature range can be defined correspondingly as the lower temperature by a heat radiation of a very specific wavelength and intensity.

In addition, it is important for the process according to the invention, particularly for its easy implementation, that the reduction or the increase of the intensity of the laser radiation can be achieved by a simple switching-on and switching-off, thus by measures which practically require no expenditures with respect to circuits. Advantageously, the workpiece is treated with a continuous laser radiation. A laser operation of this type is particularly advantageous for the simple switching-off and switching-on of the laser radiation when the limit values are reached.

The above-discussed temperature range is predetermined in such a manner that the upper limit value, in the case of metallic workpieces, is between the evaporating temperature and the melting temperature, and that the lower limit value, in the case of a melting treatment, is approximately equal to the melting temperature and for the treatment with reactive cutting gas, is in the range of the ignition temperature.

In a further development of the invention, the process is carried out in such a manner that the advancing of the laser beam during the cutting takes place with a degree of overlap of its cutting spots, which follow one another during the switching-off and switching-on, ensuring a predetermined surface roughness of the cut flanks of the workpiece. In addition, the advancing is controlled by the occurring pulse frequency or the pulse width repetition rate.

So that a hole burning operation can be terminated as soon as possible, the process is carried out in such a manner that the treatment during the hole burning will be terminated when the upper limit value has not been reached after a predetermined time period. The basis in this case is the recognition that the reaching of a certain temperature causing the hole burning, in the case of a specific workpiece geometry, can be expected within a given time and the exceeding of this time period indicates that the laser beam has now cut a hole through the workpiece and a further melting-open can therefore not take place.

In a further development, the invention is carried out in such a manner that a hole is burnt into the workpiece and/or the workpiece is cut by means of reactive and/or inert cutting gas and that, after a hole-burning took place by means of a reactive cutting gas, if necessary, a change takes place to a cutting with inert gas, or vice versa.

Reactive cutting gas, such as $O_2$, permits oxidation reactions in the area of the treatment site and thus a faster melting-open or burning of the workpiece material. Inert gas increases the quality of the cut by avoiding the formation of oxides, can reduce the surface roughness, and facilitate the cutting of critical materials, also in connection with a reactive cutting gas. Oxygen $O_2$, for example, is used as a reactive cutting gas; nitrogen $O_2$, for example, is used as an inert gas. The treatment with reactive cutting gas and with inert gas may be combined in such a manner that the hole burning takes place fast, or becomes possible at all by the use of reactive cutting gas, after which an advantageously automatically implemented change-over takes place to a cutting with inert gas in order to achieve the desired quality of the cut.

It is advantageous for the monitoring of the heat radiation emanating during the treatment of the workpiece to take place perpendicularly with respect to the workpiece and coaxially with the laser radiation. This results in an always proper positioning of the measuring point in the area of the treatment site. Mainly, however, there is the advantage that space problems are avoided because, in the case of profile cuts, the measuring device does not have to be moved along, or a sensor connected with the measuring device does not have to be arranged in the proximity of the treatment site of the workpiece. On the contrary, by means of the already existing beam guiding system, the heat radiation can easily be guided to a point which is suitable for the coupling-out of the heat radiation from the laser beam.

The removal of material by means of a laser must take place in such a manner that a maximally permissible removal depth is not exceeded. In a further development of the invention, it is therefore provided that, when material is removed from the workpiece, in addition of the heat radiation emanating from the treatment site, the removal depth is also measured and is used for correcting the limit value.

As a rule, the desired removal cannot be achieved by means of a single operation with the required precision. In order to reliably achieve higher precisions in the case of larger removal depths, it is therefore provided that the removal of material takes place in successive work steps with respective predetermined radiation intensities, that the removal depth is measured during or after each work step, and that at least the upper limit value is reduced when the removal treatment which follows the measurement and takes place with a predetermined radiation intensity would result in a probable exceeding of the desired removal depth.

It is also advantageous when a limit value correction takes place in the same manner for changing the relative advancing speed of the treatment. It may then, for example, be achieved that, in the area of movement changes, thus, for example, in the case of a relative moving reversal of the laser beam, an excessive removal of material is avoided, particularly in order to avoid an exceeding of the control range of the removal control or to supplement it.

An arrangement for monitoring the treatment is characterized in that the laser beam is aimed at the treatment site by means of a perforated mirror, behind which, in the direction of the hole aligned with the beam section directed to the treatment site, a photo diode is arranged as the radiation detector which has a band-pass filter arranged in front of it. For the coupling-out of the heat radiation from the laser beam, the perforated mirror is arranged in such a manner with its hole that it is situated in the center with respect to the intensity distribution of the laser beam and thus results in the highest possible heat radiation intensity for a measuring signal that is as large as possible.

The laser beam has a donut mode, and the hole of the perforated mirror is arranged in the area of the low radiation intensity of the beam cross-section. The intensity distribution of the donut mode, which is at least reduced in the center, permits a largely unimpaired measuring of the heat radiation emanating from the treatment site.

Another arrangement for the monitoring of the treatment is characterized in that the heat radiation emanating from the treatment site, by means of a mirror which reflects the laser radiation but transmits the heat radiation, if necessary, by means of a band-pass filter and a focussing lens, is aimed at a radiation detector constructed as a photo diode. The arrangement of a partially transmitting mirror is particularly simple from a constructional point of view.

A third arrangement for monitoring the treatment is characterized in that the laser radiation is beamed in onto the treatment site through the hole of a scraper mirror, and that the heat radiation emanating from it by means of the mirror, through a band-pass filter and a focussing lens, is aimed at the radiation detector constructed as a photo diode. The scraper mirror collects over a large surface the reflected heat radiation occurring outside the laser beam cross-section and deflects it to the radiation detector.

In all above-described applications, the band-pass filter allows the intercepting of heat radiation of an undesirable wave length emanating from the treatment site and also the preventing of possibly occurring leakage radiation and/or reflections of laser radiation out of the treatment area from having an effect and therefore falsifying the measuring results by the radiation detector.

An arrangement with which the above-described monitoring arrangements can preferably be used, is characterized in that for the hole burning and/or cutting of the workpiece, it has a sequence control which switches the laser on and off, which is operationally connected with a CNC-control unit determining the type of treatment as well as the start and the end of the treatment and is acted upon by a trigger to which the detector is connected as well as the generator determining the upper and the lower limit value.

The above-described arrangement is particularly suitable for the hole-burning and cutting of the workpiece. For the removal of material from the workpiece, it is expediently modified, specifically in view of the then used distance measuring because of which it is constructed in such a manner that, for the removal of material from the workpiece, it has a removal control which switches the laser on and off and which is operationally connected with a CNC-control unit which determines the treatment type, the desired removal and, if necessary, the relative advancing speed as well as the start and the end of the treatment, and that the removal control is acted upon by a device measuring the removal depth and by a trigger to which the detector is connected as well as generators determining the upper and lower limit value which can be adjusted with the removal control as a function of the device measuring the removal depth.

SHORT DESCRIPTION OF THE DRAWINGS

The invention is explained by means of an embodiment shown in the drawing.

BEST METHODS TO CARRY OUT THE INVENTION

Figure 3:
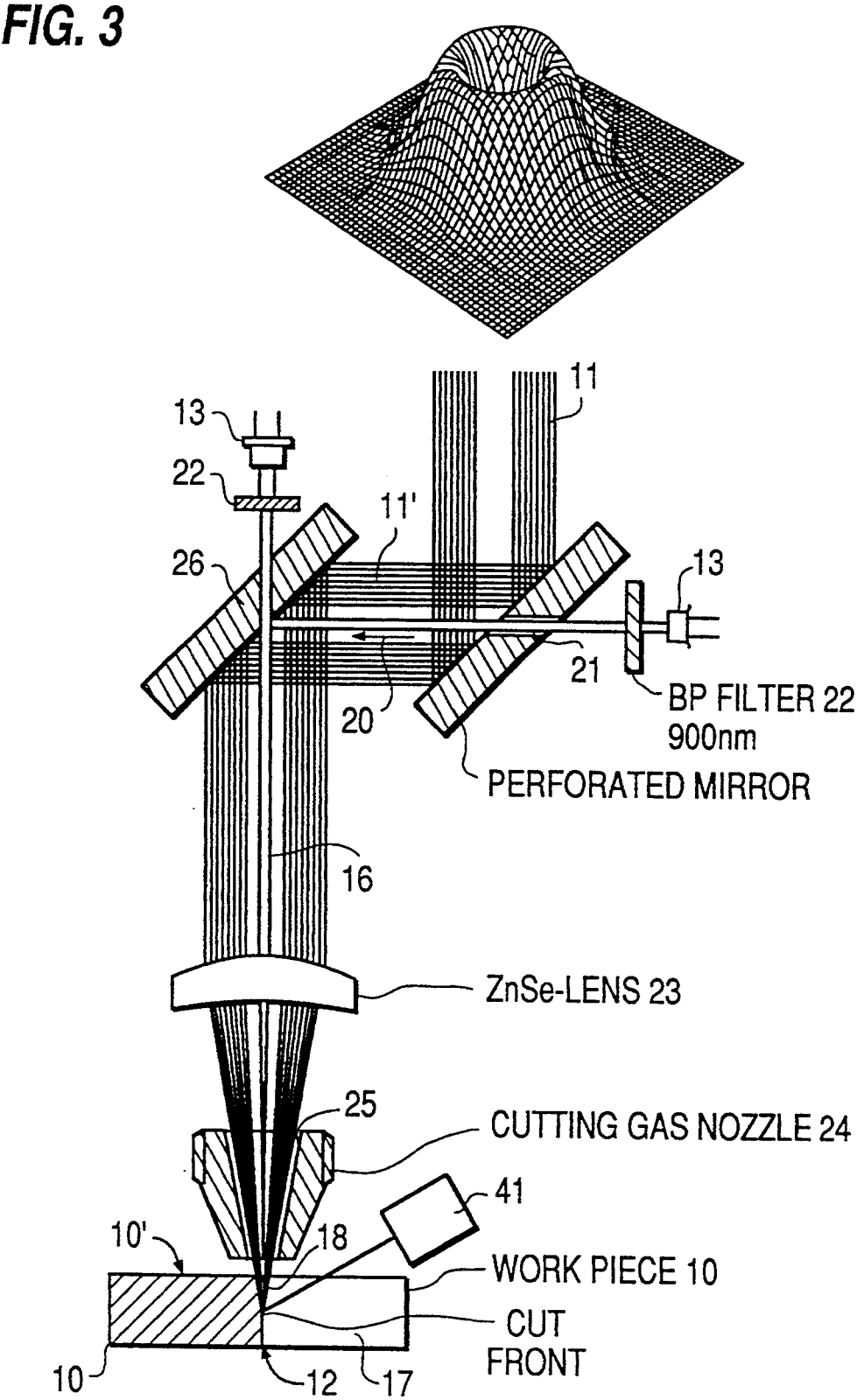
FIG. 3 is a view of the beam guiding with the radiation detector.

According to FIG. 3, a workpiece 10 is cut by means of a laser beam 11. The cutting point has the reference number 12 so that the uncut area of the workpiece 10 is provided with diagonal lines, whereas the exposed cut flanks 17 remain unmarked. In an ideal case, these flanks are completely smooth. On the treatment site 12 on the surface 10' of the workpiece 10, the laser beam 11 produces a cutting spot 18 which determines the width of the cut gap and its cut front. The size of the cutting spot 18 is determined by a focussing lens 23 situated in the beam path, such as a ZnSe lens. Close to the treatment site 12, a cutting gas nozzle 24 is arranged with a passage 25 for the laser beam and a reactive cutting and/or inert gas which is supplied in a manner that is not shown.

The laser beam 11 has a donut mode, that is, its intensity is radially distributed approximately according to the grid design shown at the top in FIG. 3. Correspondingly, the laser beam 11, in FIG. 3, is blackened only in the area of its largest intensities. FIG. 3 therefore shows that the central area of the laser beam 11 has no or only a very low intensity so that space is available here for heat radiation 16 emanating from the treatment site 12. This heat radiation is guided from the treatment site 12, through the lens 23, first to a deflecting mirror 26 and then to a perforated mirror 12, through the hole 21 of which it emerges, passes through a band-pass filter 22 and arrives on a radiation detector 13 which is, for example, constructed as a photo diode.

The hole 21 is aimed in the direction 20 of the beam section 11' arranged between the mirrors 26, 21 and its diameter is therefore selected such that it is impossible that the radiation coming from the laser, directly through the hole 21, can arrive in the direction of the radiation detector 13. The perforated mirror 21, when there is no deflecting mirror 26, may also be arranged such that the beam section 11', through the lens 23, arrives directly on the treatment site 12 if the beaming on the perforated mirror 19 takes place correspondingly laterally.

The effect of the laser beam 11 on the treatment site 12 causes a rise of the temperature of the workpiece material when the laser is switched on at the point in time te. If it is assumed that ideally the laser is switched on from te to ta with a predetermined intensity, this will result in the rising curve of the radiation detector signal or diode signal, indicated in FIG. 1 as the ideal curve. The rise takes place up to an upper limit value 14, thus to a temperature value at which the treatment site 12, as a result of the emission of a heat radiation determined by the wave length and the intensity, indicates that the workpiece material has reached a specific temperature. At this moment ta, the laser is switched off so that the treatment site 12 cools off, and the diode signal is therefore reduced until the bottom limit value 15 is reached. At this moment tel, the laser is switched on again, etc. The result is a sequence of measuring values of the radiation detector 13 which occur when the laser is switched on and switched off, as a function of the time between the limit values 14, 15 according to FIG. 1. The pertaining laser pulses or switch-on times of the laser are found in the bottom part of this figure. It is illustrated that the first switch-on duration ta—te for the general heating-up is slightly longer than the subsequent switch-on durations, such as ta1—te2.

Figure 1:
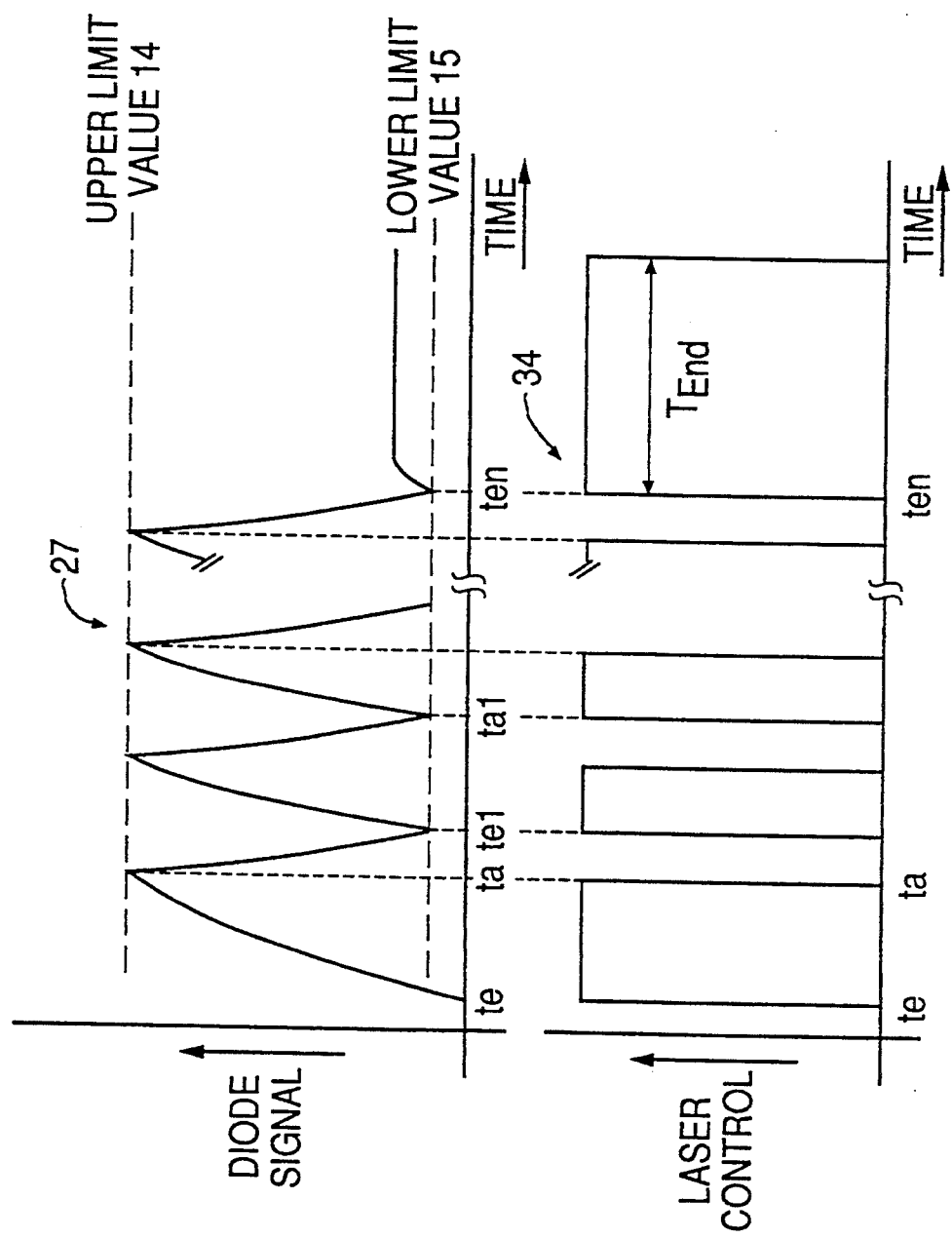
FIG. 1 is a diagrammatic representation of the measuring result of a radiation detector and of the laser control, in each case, as a function of the time.

In is also shown in FIG. 1 that the switching-on of the laser at a point in time ten results in no increase in the measured value of the radiation detector 13. On the contrary, after a predetermined time TE, the same measured value is always still present or has even fallen. The reason is that, in the area of the laser beam, there is no longer any material to be heated up, for example, because a hole-burning operation has been concluded by a boring-through. Such a measuring result is used for terminating the hole-burning or for switching from the hole-burning operation, when the laser beam is stopped, to a continuous or step-by-step advancing of the laser beam.

Figure 2:
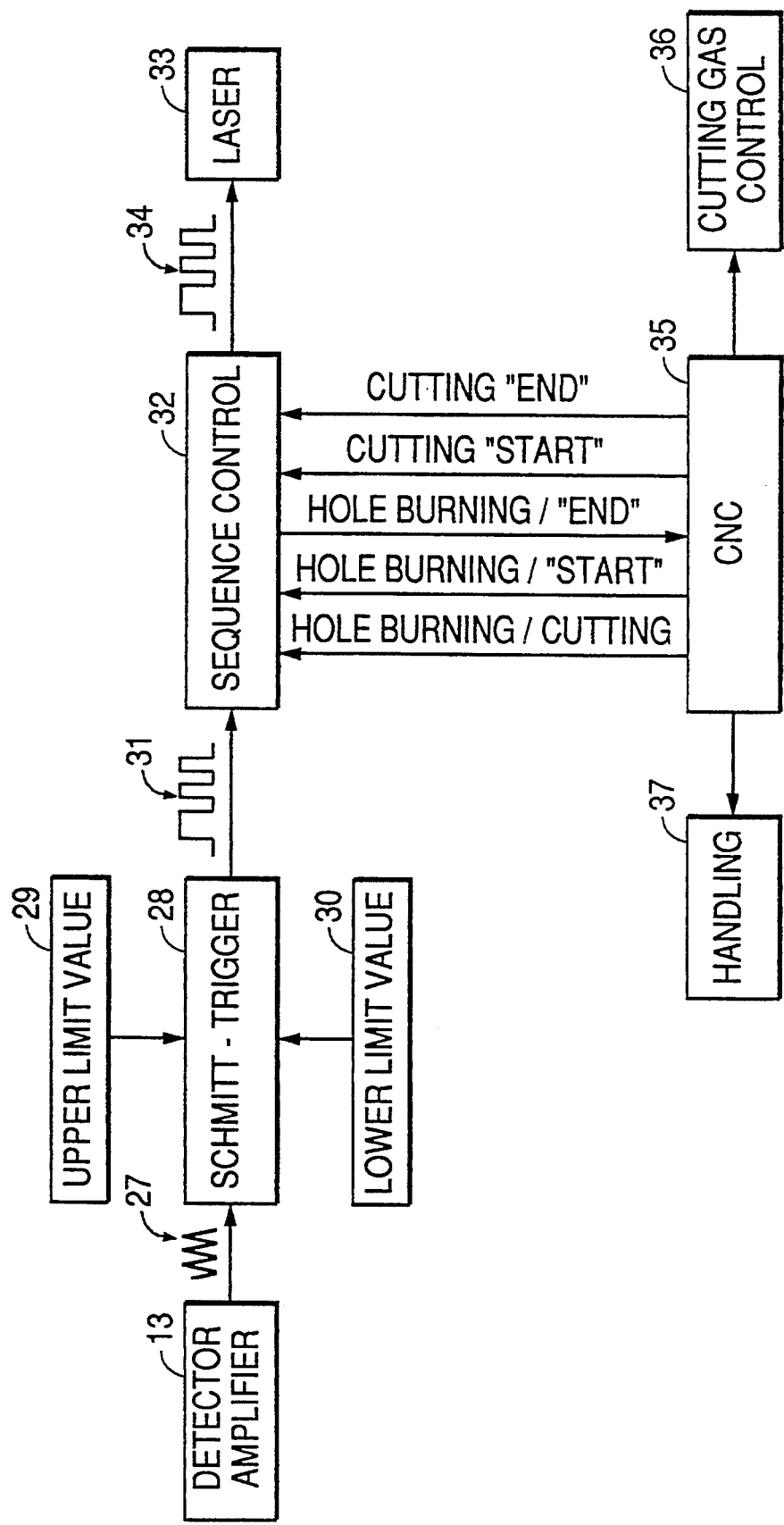
FIG. 2 is a block diagram of a control device for carrying out the process according to the invention.

FIG. 2 shows the operational linking of the most important components of an arrangement for the treatment. The measured values 27, which are determined by the detector 13 in the course of time, are transmitted in an amplified manner to a Schmitt trigger 28 which is also connected with generators 29 and 30 for the upper limit value 14 as well as for the lower limit value 15. The Schmitt trigger 28, taking into account the limit values 14, 15, correspondingly supplies switching pulses 31 to the measured value sequence 27 for a sequence control 32 by which the laser 33 is controlled, specifically by means of the control pulses 34 indicated in FIG. 1.

The sequence control 32 is also operationally connected with the CNC control unit 35. The latter determines, for example, the operating mode of the sequence control 32 and therefore gives the commands for either the hole-burning operation or the cutting operation of the sequence control 32. The difference, in this case, is, for example, that in the hole-burning operation, an automatic switch-off and/or change-over device must exist for the case that the hole goes through. In this case, the sequence control 32 signals the end of the hole-burning to the control 35. The start commands for the hole burning, and the cutting and the switch-off command for the cutting operation also emanate from the control unit 35. The latter also influences the cutting gas control 36, thus the supply of, for example, oxygen to the hole burning operation. In addition, the CNC-control unit 35 has the purpose of influencing the so-called handling 37, thus the required adjusting movements during the hole burning and/or cutting.

The above-described process steps and arrangements are also suitable for the hole burning and cutting of non-metallic materials. For example, wood, rigid expanded polyurethane, plastics, glass, ceramics and cotton fabrics can also be cut. The upper and/or lower limit values, such as the melting or igniting temperature, or the like, are then replaced by experimental values which are relevant to these materials, such as the decomposition temperature and/or the softening temperature in the case of plastics.

Carbon dioxide lasers, carbon monoxide lasers, solid-state lasers, eximer lasers or ionized argon lasers are used for generating the laser radiation.

FIG. 3 shows another possibility of monitoring the heat radiation reflected by the treatment site 12, specifically by using a partially transmitting mirror 26 which therefore fully reflects the laser radiation of the laser beam 11 but transmits the heat radiation 16 so that this heat radiation, through a possibly required band-pass filter 32 and/or a focussing lens, which is not shown, can act upon the radiation detector 13 constructed as a photo diode.

Figure 4:
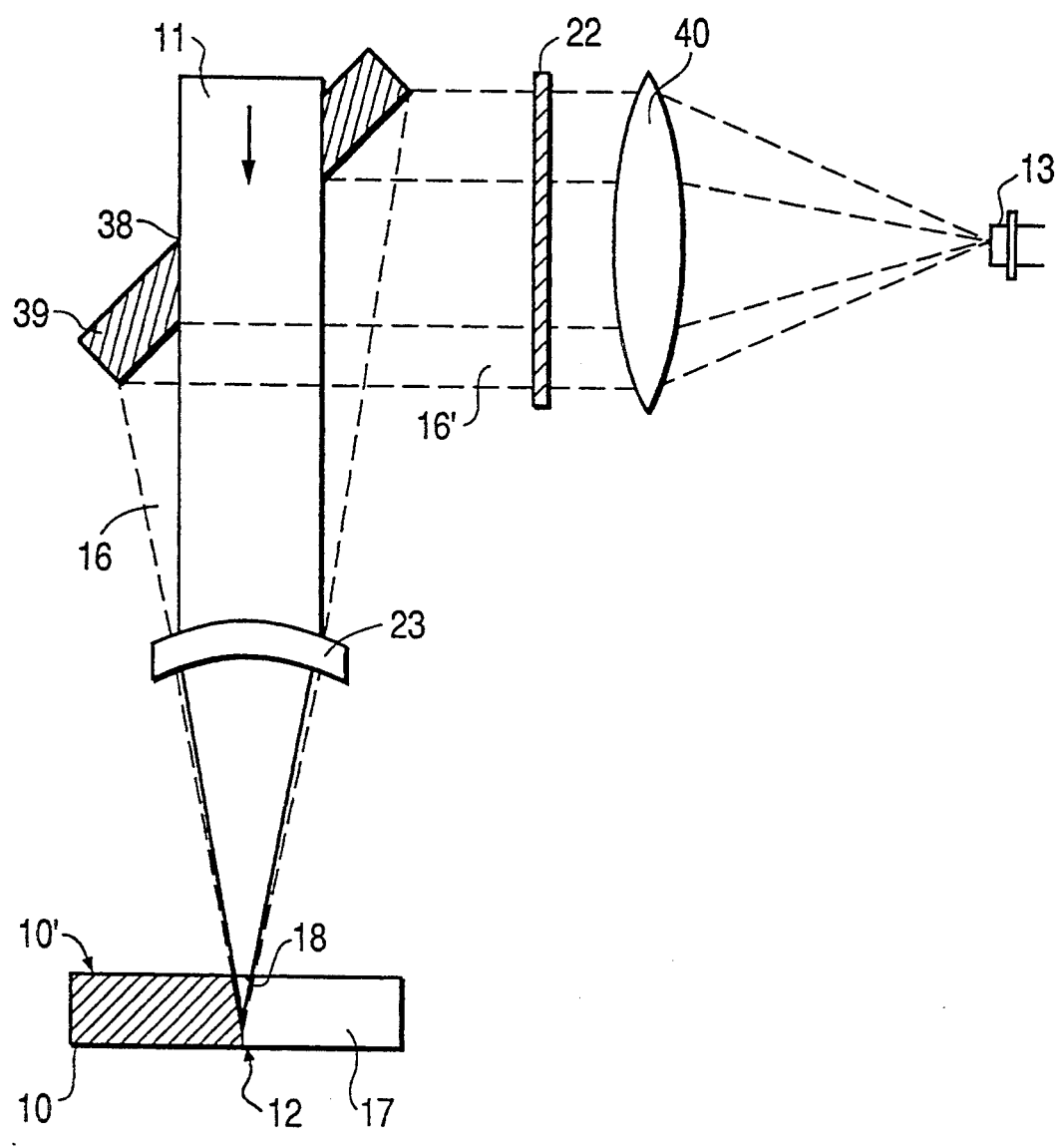
FIG. 4 is a schematic representation of a monitoring device with a scraper mirror.

FIG. 4 shows a laser beam 11 which is generated, for example by a $CO_2$-laser and which is beamed through the hole 38 of a scraper mirror 39 in the direction of the workpiece 10. A focussing lens 23 focusses the laser radiation and generates the beam focus 18 on the workpiece surface 10'. The heat radiation 16 emanating from the workpiece 10 during the cutting arrives on the ring of the scraper mirror 39 and is radiated by it at an angle with respect to the laser beam 11. Then the heat radiation 16' is supplied through a band-pass filter 22 to a focussing lens 40 which focusses the heat radiation on the radiation detector 13 constructed as a photo diode.

Figure 5:
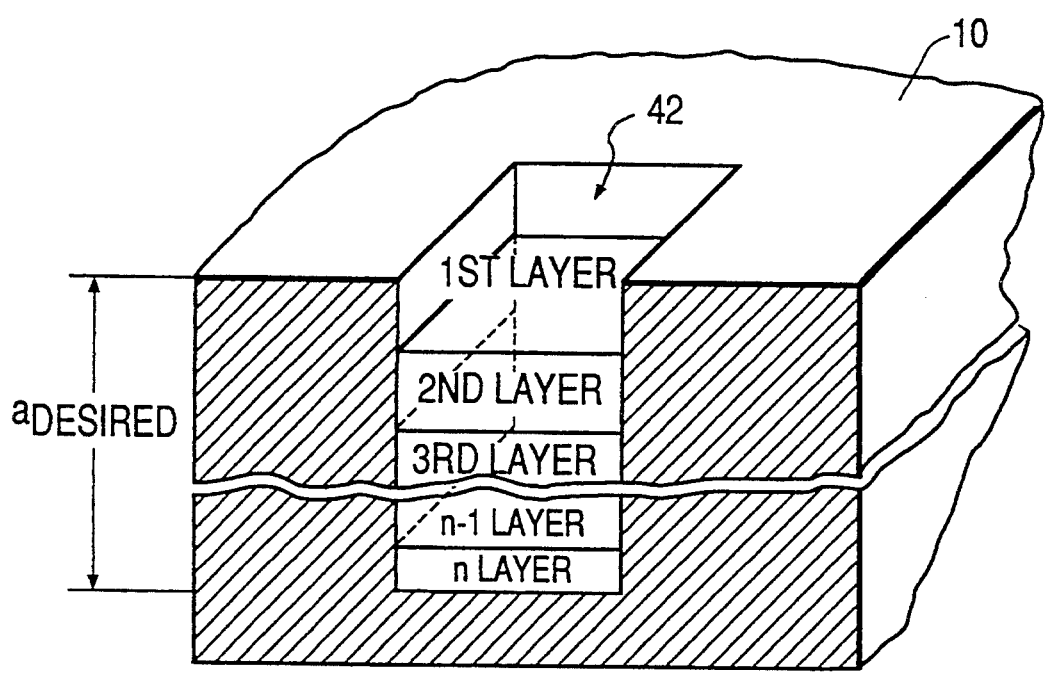
FIG. 5 is a schematic representation of a multi-layer removal of material.

FIG. 5 shows a workpiece 10 into which a regular-solid-shaped indentation 42 of a total removal depth $a_{desired}$ is to be worked by means of laser radiation. When this removal depth is comparatively large, it cannot be achieved by means of a single operation. On the contrary, the area of the workpiece 10 to be removed must be treated several times so that the material is removed in layers. In FIG. 5, these layers are arranged above one another having exactly the same size and the same thickness. It is understood, however, that as a result of a different design of the indentation 42, the layers may also be constructed differently, that is, of different sizes and thicknesses.

Figure 6:
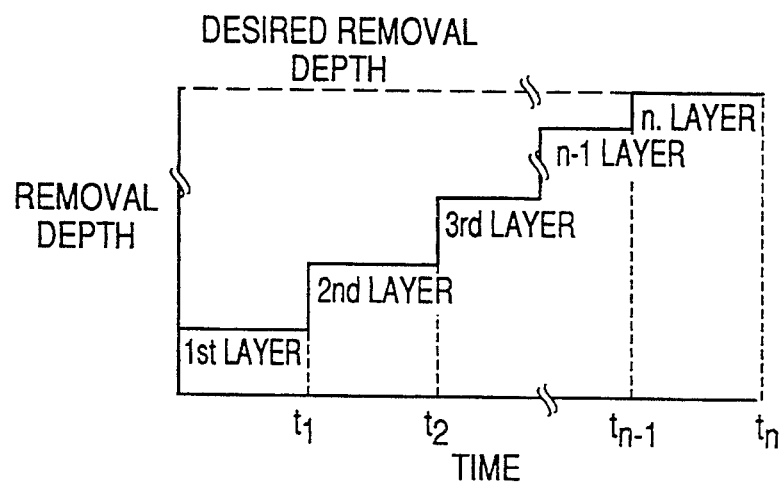
FIG. 6 is a view of the removal depth a as a function of the time t during the removal of layers in a workpiece of FIG. 5.

For the case of FIG. 5, FIG. 6 shows the removal depth a above the time t, and it is illustrated that the removal depth, because of successive work steps with respect to time, the duration of which is characterized by $t_1$, $t_2$, etc., is increased in equally large amounts. This means that the removal of the material takes place with a respective predetermined radiation intensity. It is illustrated that, after the removal of the nth-1st layer, the application of an unchanged radiation intensity would result in an exceeding of the desired removal depth. The nth layer must therefore be removed in such a manner that at least the upper limit value is reduced. This is explained by means of FIG. 7.

Figure 7:
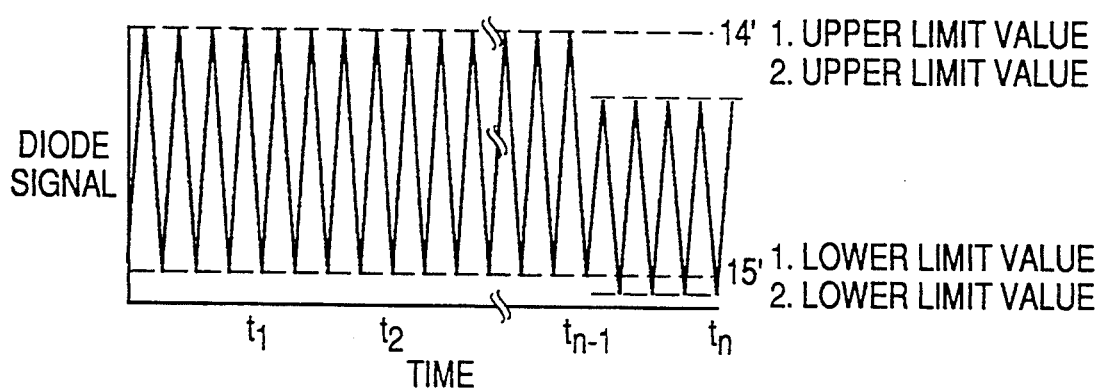
FIG. 7 is a representation for explaining the limit value correction which is similar to FIG. 1 above.

In FIG. 7, the diagram shows the dependence of the diode signal of a device 41 measuring the removal depth from the time t for the work steps of FIGS. 5, 6. It is illustrated that, in the case of the work steps $t_1$, $t_2$ to $t_{n-1}$, a first upper limit value 14' is used, as well as a first lower limit value 15'. Between these limit values, during a removal interval, such as $t_1$, a number of laser light pulses of a predetermined intensity are used. The radiation energy which is supplied as a result is determined by the limit values 14', 15'. For the removal of the nth layer, the limit values are reduced.

The supplied energy is now determined by the second upper limit value and by the second lower limit value. Both limit values are lower. The supplied energy is lower so that the desired removal depth is not exceeded.

By means of FIGS. 5 to 7, a step-by-step removal of material is described. However, it is also possible that the desired removal depth can be achieved by means of a single work step, particularly if the depth is low. In this case, depending on the size of the desired removal depth, an influencing of the limits values 14',15' must also take place Both can take place by means of a measuring of the removal depth which takes place during the removal. A device 41 is provided for this purpose which is illustrated schematically in FIG. 3. It measures at an angle with respect to the laser beam 11 beaming on the workpiece 10. However, such a measuring may also take place coaxially. The device may, for example, be an optical distance sensor operating according to the triangulation principle. The distance measuring takes place either after a material-removing work step or during it. The latter is required when only a single material-removing work step takes place, as described above.

Figure 8:
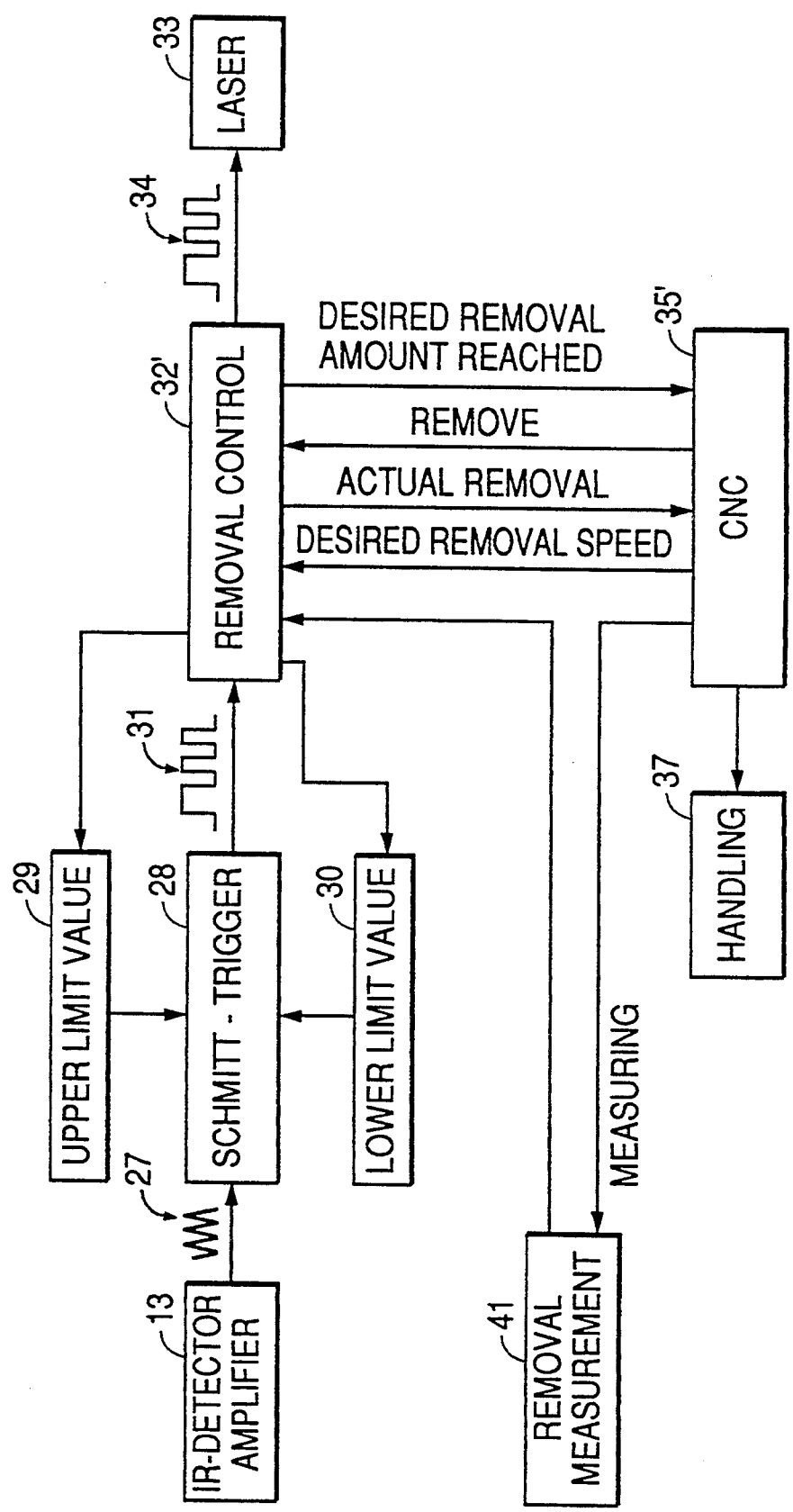
FIG. 8 is a representation that is similar to FIG. 2 with a block diagram of a control device for carrying out the removal of material according to the invention.

The distance-measuring device 41 is operationally included in a control device illustrated in the manner of a block diagram in FIG. 8 and similar to the control device of FIG. 2. The treatment site 12 of the workpiece 10 is monitored by a detector 13 in the same manner as during the cutting and hole-burning operation, the detector 13 supplying an amplified signal to a Schmitt trigger 28 which, while observing the upper and lower limit values 14', 15' of the generators 29, 30, transmits switching pulses 31, which correspond to the measured value sequence according to FIG. 7, to a removal control 32 for the controlling of the laser 33 by means of the control pulses 34. However, in addition, the treatment site 12 is also monitored by the distance measuring device 41 so that a removal measuring takes place, the result of which is made available to the removal control 32'.

The removal control 32', according to FIG. 8, is also operationally connected with a CNC-control unit 35' which determines the operating mode, the desired removal $a_{desired}$, the relative advancing speed as well as the start and the end of the treatment by supplying "remove" signals to the removal control 32' and receiving from it the actual removal as well as the signal "desired removal achieved" so that the "remove" signal can be stopped In addition, the CNC-control 35', by means of "measure" commands can control the operation of the device 41, specifically either at the same time with the "remove" command, or on-line or afterwards, and therefore off-line.

Industrial Use

The invention is used for the treatment of workpieces, particularly for cutting, hole-burning and material removal with respect to metallic workpieces.

We claim:

1. A process for treating workpieces by means of laser radiation, particularly for the cutting, hole burning and removal of material with respect to metallic workpieces, in which the treated site of the workpiece is monitored by means of a radiation detector which contributes to reducing the intensity of the laser radiation when an upper limit value is reached and to increasing it when a lower limit value is reached, characterized in that, by means of the radiation detector, heat radiation 16 is measured which emanates from its treated site, by means of which an upper temperature as the upper limit value of a predetermined temperature range and a lower temperature as the lower limit value of this temperature are monitored, and in that the laser radiation is switched off when the upper limit value is reached and is switched on again when the lower limit value is reached.

2. A process according to claim 1, characterized in that the upper limit value 14, in the case of metallic workpieces, is between an evaporation temperature and a melting temperature, and in that the lower limit value, during a melting treatment, is approximately equal to the melting temperature and during the treatment with reactive cutting gas is in the range of the ignition temperature.

3. A process according to claim 1, characterized in that the advancing of the laser beam during the cutting takes place with a degree of overlap of the cutting area which follow one another during the switching-off and switching-on, the degree of overlap ensuring a predetermined surface roughness of the cut flanks of the workpiece.

4. A process according to claim 1, characterized in that, in the case of hole burning, the treatment is concluded when the upper limit value has not been reached after a predetermined time period.

5. A process according to claim 1, characterized in that the workpiece is treated with a continuous laser radiation.

6. A process according to claim 1, characterized in that the hole burning and/or cutting with respect to the workpiece takes place by means of reactive and/or inert cutting gas.

7. A process according to claim 1, characterized in that the monitoring of the heat radiation emanating from the workpiece during the treatment takes place vertically with respect to the workpiece and coaxially with the laser radiation.

8. A process according to claim 1, characterized in that, when material is removed from a workpiece, in addition to the heat radiation emanating from the treated site, the removal depth is also measured and is used for a limit value correction.

9. A process according to claim 8, characterized in that the removal of material takes place in work steps which are successive with respect to time with respective predetermined radiation intensities, in that, during or after each work step, the removal depth is measured, and in that at least the upper limit value is reduced when the removal treatment, which follows the measuring and takes place with a predetermined radiation intensity, would lead to a probable exceeding of the desired removal depth.

10. A process according to claim 1, characterized by changing the relative advancing speed of the treatment in response to a limit value correction.

11. An arrangement for the treatment of workpieces by means of laser radiation, according to claim 1, characterized in that the laser beam, by means of a perforated mirror, is aimed at the treated site, behind the hole of which aligned in the direction of the beam section guided to the treated site, a photodiode is arranged as the radiation detector and a band-pass filter is arranged in front of the radiation detector.

12. An arrangement for treating workpieces with laser radiation, according to claim 11, characterized in that the laser beam 11 has a donut mode, and the hole of the perforated mirror is arranged in the area of low radiation intensity of the beam cross-section.

13. An arrangement for treating workpieces with laser radiation according to claim 1, characterized in that the heat radiation emanating from the treated site, by means of a mirror which reflects the laser radiation but transmits heat radiation through a band-pass filter and a focussing lens, is aimed at a radiation detector constructed as a photo diode.

14. An arrangement for treating workpieces by means of laser radiation, according to claim 1 characterized in that the laser radiation is beamed in onto the treated site through the hole of a scraper mirror, and in that the heat radiation emanating from it is directed from the mirror through a band-pass filter and a focussing lens, onto the radiation detector constructed as a photo diode.

15. An arrangement for treating workpieces by means of laser radiation, according to claims 1, characterized in that, for hole-burning and/or cutting with respect to the workpiece, it has a sequence control which switches the laser on and off and which is operationally connected with a CNC-control unit determining the operating mode as well as the start and the end of the treatment and which is acted upon by a trigger 28 to which the detector as well as generators are connected which determine the upper and the lower limit value.

16. An arrangement for treating workpieces by means of laser radiation, according to claim 1, characterized in that, for removing material of the workpiece 10, it has a removal control which switches the laser on and off and which is operationally connected with a CNC-control unit which determines at least one of the operating mode, the desired removal and the relative advancing speed as well as the start and the end of the treatment, and in that the removal control is acted upon by a device measuring the removal depth and by a trigger to which the detector as well as generators are connected which determine the upper and the lower limit value the generators being adjustable by means of the removal control as a function of the device measuring the removal depth.

17. A process according to claim 6, further characterized int hat a change-over to inert gas takes place after a hole-burning has taken place by means of reactive cutting gas.

18. A process according to claim 6, further characterized in that a change-over to reactive cutting-gas takes place after a hole-burning has taken place by means of inert gas.

* * * * *